Patented Mar. 25, 1924.

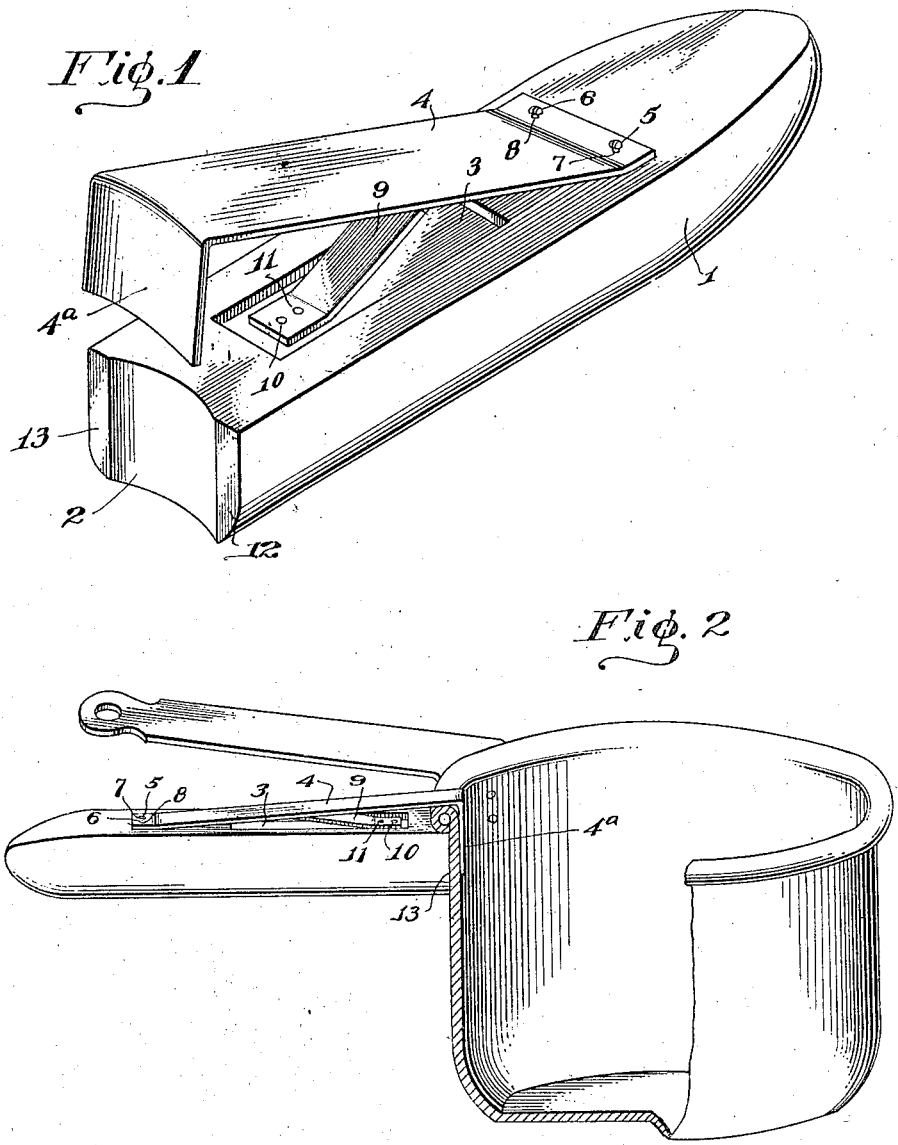

1,488,045

UNITED STATES PATENT OFFICE.

WALTER KARL HARRIS, OF LOCKHART, TEXAS.

PAN LIFTER.

Application filed November 23, 1923. Serial No. 676,523.

*To all whom it may concern:*

Be it known that I, WALTER K. HARRIS, a citizen of the United States, residing at Lockhart, in the county of Caldwell and State of Texas, have invented a new and useful Pan Lifter, of which the following is a specification.

This invention relates to devices for lifting and handling hot pans and vessels, one of the objects thereof being a construction which admits of a lower manufacturing cost than has heretofore been possible with devices for the purpose mentioned.

A further object is to provide a device for the purpose mentioned which, with the aid of one hand only, will grip the pan or vessel instantly, in such a firm manner that the same may be tilted safely to any angle, in order to pour out liquids, or be inverted completely, in the case of bread pans, cake pans and the like, in order to dump the bread or cake quickly, the construction being such that the device will release its grip automatically, when it is so desired.

A further object is to provide a device for the purpose mentioned, which requires a moderate pressure, only, to secure and retain its grip upon the pan or vessel, and in which the gripped portion of the pan or vessel is held between smooth surfaces, thereby avoiding injury to aluminum and other soft-metal pans and vessels, it being recalled that such injury results from using devices provided with serrations upon the gripping surfaces, notably if devices of the sort alluded to require considerable hand-pressure in order to retain their grip.

A further object is to provide a device for the purpose mentioned in which the portion that will, in operation, constitute the lower section is adapted to be formed from wood, the resultant advantage being that the device may be put to constant use about a hot stove for an extended period, without becoming uncomfortably hot as is the case with all-metal devices.

A further object is to provide a device which, in addition to lifting and manipulating hot pans and vessels efficiently, can be used also for handling other hot objects about a stove, such as turning oven door handles, lifting knobbed pot-lids and tilting large preserving kettles, thereby eliminating the necessity for rags or cloths around a stove.

With the foregoing and other objects in view, the invention resides in the combination of parts depicted in the drawings and hereinafter described and claimed, it being understood that, within the scope of what is claimed, changes in the precise embodiment of the invention shown can be made without departing from the spirit of the invention.

In the accompanying drawings, the preferred form of the invention has been shown, and in said drawings:—

Figure 1 is a perspective view of my device in its inoperative state;

Figure 2 is a perspective view of my device positioned for lifting and manipulating a sauce-pan, or small stew-pan, parts being in section.

Referring to the figures by characters of reference, 1 designates a rectangularly shaped block of wood, tapered at the end which will be referred to hereinafter as the "rear end", the front end of said block being scalloped to form a concaved recess 2, leaving two narrow plane faces 12 and 13, disposed on opposite sides of the recess. A strip 4 of metal is slightly bent near one end, small holes 7 and 8 being punched through the metal at the bending-line and near the sides. Fastening devices, such as oval-headed screws 5 and 6, pass through the holes 7 and 8 and are screwed into the block 1 which is underneath, the size of the screws, and the extent to which they are screwed into the block, preventing any appreciable lateral movement of the strip 4, but allowing the same to oscillate freely a predetermined distance. At a point near its free end, the strip 4 is bent towards the block 1 at a slightly acute angle to form a finger $4^a$, the vertical center of the section $4^a$ thus formed being bent inwardly to conform to the shape of the recess or scallop 2. Cut into the upper side of the block 1 is a channel 3, commencing near the front end of the block and extending to a point about midway thereof. One end of a leaf spring 9 is fastened in the front portion of the channel 3 with two tacks or small nails 10 and 11, the free end of the leaf spring being bent in such manner that the metal strip 4 is held yieldingly in the position shown in Figure 1.

My device utilizes, in a novel and efficient manner, the outwardly projecting flange, crimp or roll with which nearly all kitchen pans and vesels are provided, as is hereinafter made clear. To grip any such pan or vessel, the device is held naturally in one hand, the fingers underneath and the thumb elevated above, or held in light contact with, the strip 4 near its free end. While the front end thereof is somewhat lowered, the device is thrust toward the pan or vessel at a point which will bring the upper side of the front end of the block 1 directly underneath the flange, crimp or roll, such flange, crimp or roll passing between the elevated strip of metal and the block. The strip 4 then is pressed downwardly as far as it will go, such action automatically lowering the rear end of the block 1 until the plane surfaces 12 and 13 come into contact with the outer wall of the pan or vessel. In this position the flange, crimp or roll is imprisoned between the horizontal portion of the strip 4 and the upper surface of the block 1, while a portion of the wall of the pan or vessel is imprisoned between the vertical finger 4$^a$ of the strip 4 and the front end of the block 1, as pictured in Figure 2. As long as pressure is retained upon the strip 4, the pan or vessel may be manipulated as freely as if the device were riveted. When pressure upon the strip 4 is discontinued, the strip will be thrown upward to the limit of its oscillatory movement by the spring 9, thereby effecting an automatic release from the pan or vessel.

In gripping square or rectangular pans or vessels, the side wall of the pan or vessel is brought into flat contact with the plane faces 12 and 13, as well as into contact with the vertical center of the finger 4$^a$. In gripping round pans or vessels, contact is obtained between the inner corners of the faces 12 and 13 and a variable portion of the part 4$^a$, depending upon the diameter of such pan or vessel. Since the recess 2 and the finger 4$^a$ are made to conform to the smaller round pans and vessels, my device will grip and hold with equal firmness any size square, rectangular or circular pan or vessel provided with an outwardly projecting flange, crimp or roll.

My device may be used also for effectively gripping and turning oven door handles, lifting pot lids equipped with knobs, tilting large preserving kettles not equipped with ears for that purpose, rescuing spoons or forks which have slipped into cooking vessels, and dipping hot water or soup with drinking or measuring cups, etc.

What I claim is:

1. A device for lifting pans which are provided with a bead, the device embodying a handle of heat-insulating material in the form of a block, a strip secured at its inner end to the handle and provided at its outer end with a finger disposed at an angle to the strip adapted to overlap the outer end surface of the handle, the finger being spaced from the outer end surface of the handle by a distance closely approximating the thickness of the wall of the pan to be lifted, thereby to hold the wall of the pan against the outer end surface of the handle and to hold the outer end of the handle beneath the bead, and spring means interposed between the strip and the handle for moving the strip into such a position that the wall and the bead of the pan may be located as aforesaid with respect to the handle.

2. A device for lifting pans, comprising a handle provided at one end with a concaved seat and equipped with plane surfaces located upon opposite sides of the seat, and a yieldable strip secured at one end to the handle, the other end of the strip being provided with a finger disposed at an angle to the strip and adapted to cooperate with the seat and with said plane surfaces, the finger being concaved to conform to the concavity of the seat.

In testimony that I claim the foregoing as my own, I have hereto affixed my signature.

WALTER KARL HARRIS.